United States Patent Office 2,764,586
Patented Sept. 25, 1956

2,764,586

MANUFACTURE OF N,N'-DIHYDROANTHRA-QUINONE-AZINE

Hermann Thielert, Leverkusen-Wiesdorf, and Fritz Baumann, Leverkusen-Bayerwerk, Germany, assignors to Farbenfabriken Bayer Aktiengesellschaft, Leverkusen, Germany, a corporation of Germany No Drawing. Application August 18, 1953,
Serial No. 375,045

Claims priority, application Germany August 27, 1952

4 Claims. (Cl. 260—263)

This invention relates to the manufacture of N.N'-dihydroanthraquinone-azine from α-aminoanthraquinone.

In our copending application Ser. No. 256,118, filed November 13, 1951, we have described a process for the production of N.N'-dihydroanthraquinone-azine by melting 1 part by weight of α-amino-anthraquinone with less than 4 parts by weight of an alkali phenolate in the presence of an oxidation agent, such as alkali chlorates, alkali nitrates and potassium persulfate and an alkali metal salt of a lower fatty acid.

N.N'-dihydroanthraquinone-azine can also be obtained from α-amino-anthraquinone in good yields by carrying out the above reaction in the presence of gases containing oxygen, for instance air, as oxidation agent. These gases containing oxygen are intimately contacted with the reaction mixture, for instance by intensely stirring, and the process is preferably performed in the presence of catalysts, for instance iron chloride, iron oxide, manganese dioxide, manganese sulfate, cobalt chloride and copper acetate. Also mixtures of these catalysts may be used.

The reaction is preferably carried out at temperatures between about 175–225° C. It is of advantage to employ a gas with an oxygen content not below about 10% since otherwise the yield of the dyestuff is decreased.

The invention is further illustrated by the following examples without being restricted thereto, the parts being by weight:

Example 1

50 parts of potassium hydroxide (90%) are introduced into 75 parts of molten phenol at 100° C. and then heated to 130° C. 20 parts of sodium acetate are added at 140–160° C. and then 1.5 parts of manganese sulfate and 2 parts of copper acetate. At 195–200° C. 50 parts of α-amino-anthaquinone are added to the melt with intensively stirring and introducing air. The temperature is maintained for 3½ hours at 210° C. and then at 220° C. for 2½ hours. Thereupon the melt is poured into 2 liters of water, boiled for one hour and filtered with suction in the heat after addition of 5 cc. of a concentrated sodium bisulfite solution. The filter cake is washed with hot water several times and dried.

The crude dyestuff is dissolved in 600 parts of concentrated sulfuric acid and the solution adjusted with water to an acid content of 83%. After filtering, washing and drying the dyestuff is obtained in pure form.

Other catalysts, for instance iron oxide, iron chloride and cobalt chloride may be used with equal success instead of manganese sulfate. Furthermore the air may be passed over the melt instead of into the melt.

Example 2

100 parts of potassium hydroxide (90%) are introduced into 150 parts of molten phenol at about 100° C. 40 parts of anhydrous sodium acetate and then 4 parts of iron oxide or manganese dioxide are added at 160° C. to the potassium phenolate thus obtained. The melt is heated to 200–210° C. and 100 parts of α-aminoanthraquinone are added while intensively stirring and conducting air over the melt. Care has to be taken that the temperature does not drop below 194° C. After 6–7 hours' heating at 210–220° C. the reaction is complete.

The dyestuff is purified as described in Example 1. Instead of air, a mixture of air and oxygen may be used with the same good result.

We claim:

1. Process for the manufacture of N.N'-dihydroanthraquinone-azine which comprises heating together 1 part by weight of α-aminoanthraquinone with less than 4 parts by weight of an alkali phenolate, an alkali salt of a lower fatty acid, an inert gas containing at least about 10% free oxygen and a heavy metal catalyst of the group consisting of iron chloride, iron oxide, manganese dioxide, manganese sulfate, cobalt chloride and copper acetate at temperatures of about 175–225° C.

2. Process for the manufacture of N.N'-dihydroanthraquinone-azine which comprises heating together 1 part by weight of α-aminoanthraquinone with 2 parts by weight of an alkali phenolate, an alkali salt of a lower fatty acid, an inert gas containing at least about 10% free oxygen and a heavy metal catalyst of the group consisting of iron chloride, iron oxide, manganese dioxide, manganese sulfate, cobalt chloride and copper acetate at temperatures of about 175–225° C.

3. Process for the manufacture of N.N'-dihydroanthraquinone-azine which comprises heating together 1 part by weight of α-aminoanthraquinone with 2 parts by weight of an alkali phenolate, alkali acetate, an inert gas containing at least about 10% free oxygen and a heavy metal catalyst of the group consisting of iron chloride, iron oxide, manganese dioxide, manganese sulfate, colbalt chloride and copper acetate at temperatures of about 175–250° C.

4. Process for the manufacture of N.N'-dihydroanthraquinone-azine which comprises heating together 1 part by weight of α-aminoanthraquinone with 2 parts by weight of an alkali phenolate, an alkali salt of a lower fatty acid, air, and a heavy metal catalyst of the group consisting of iron chloride, iron oxide, manganese dioxide, manganese sulfate, cobalt chloride and copper acetate at temperatures of about 175–225° C.

No references cited.